Sept. 13, 1949.    R. E. McADAM ET AL    2,481,677
CAMERA FINDER AND FOCUS
INTERLOCKING MECHANISM
Filed June 6, 1946    2 Sheets-Sheet 1
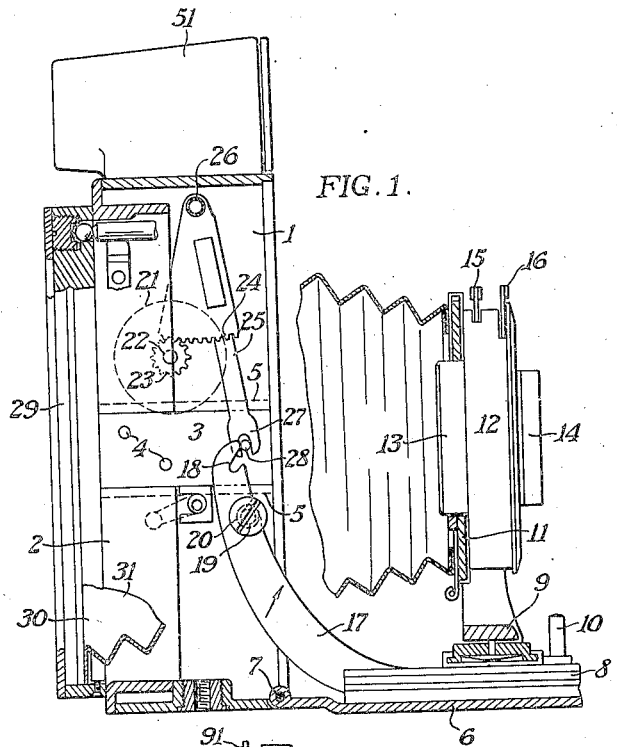
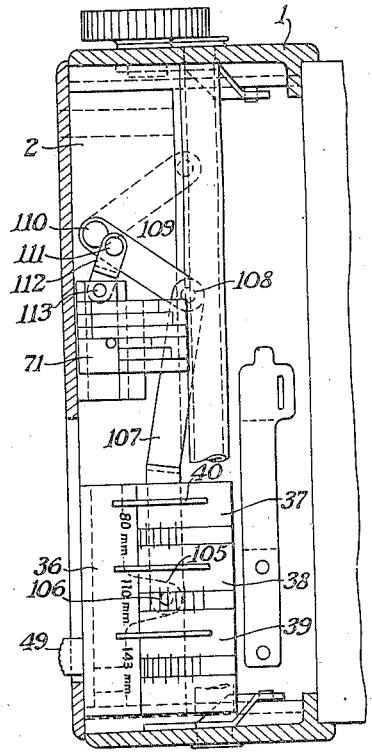
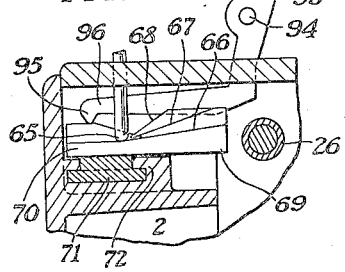
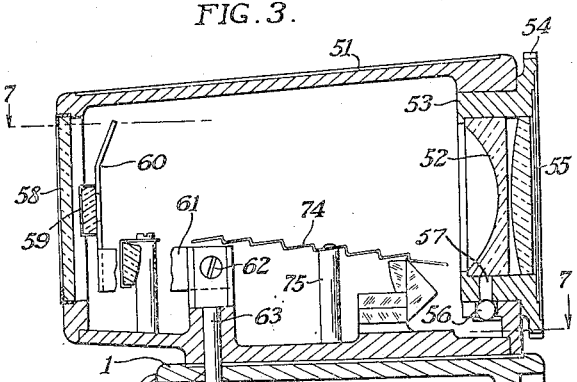
RALPH E. McADAM AND KENNETH E. BAUER
INVENTORS
BY
ATTORNEYS Sept. 13, 1949.
R. E. McADAM ET AL
CAMERA FINDER AND FOCUS
INTERLOCKING MECHANISM
2,481,677
Filed June 6, 1946
2 Sheets-Sheet 2
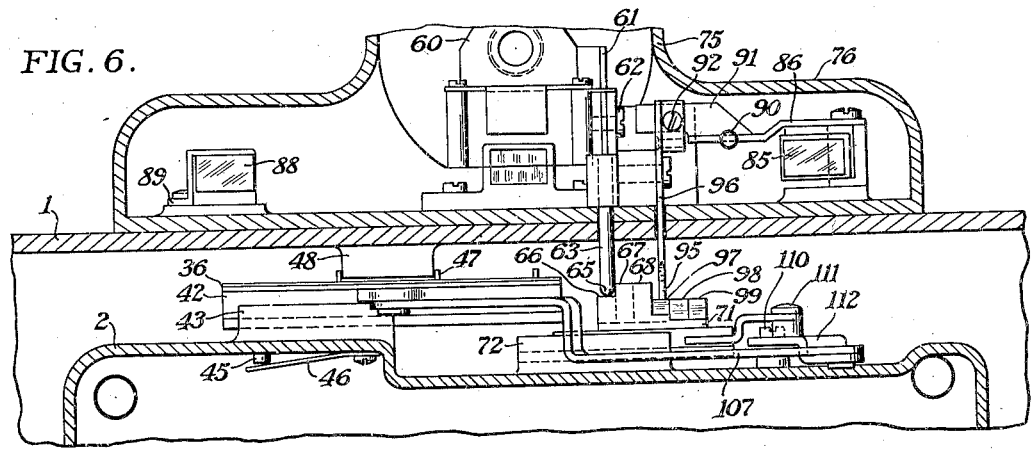
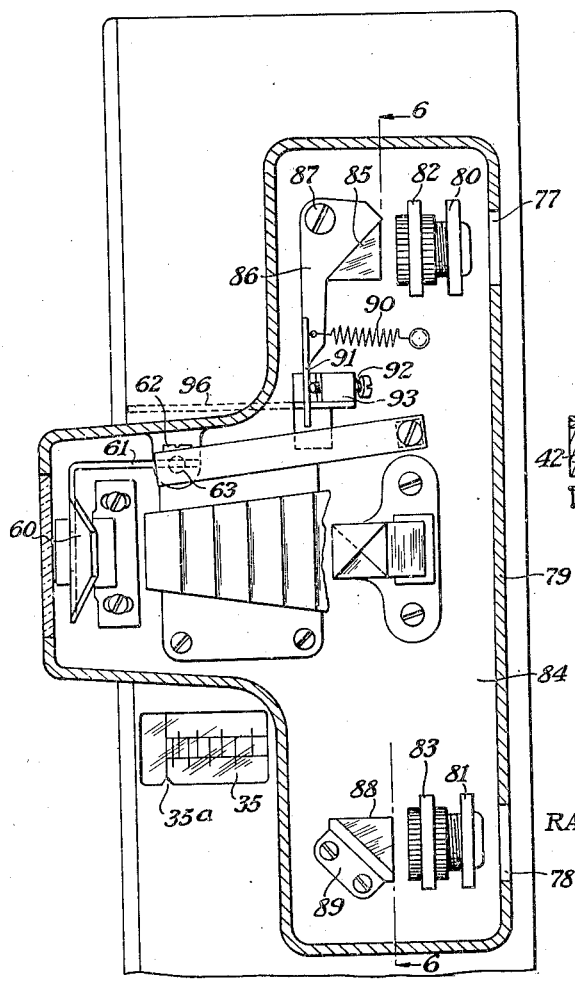
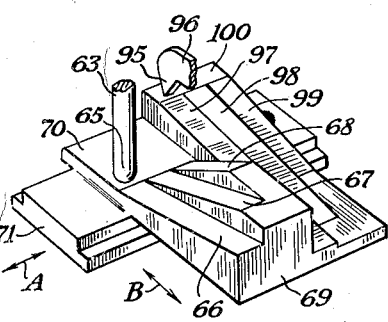
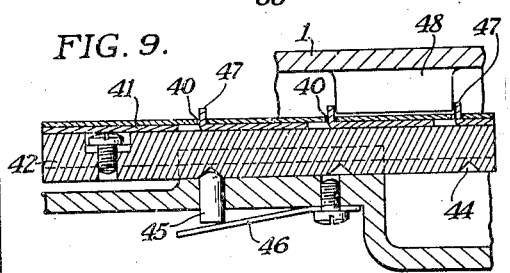
RALPH E. McADAM AND KENNETH E. BAUER
INVENTORS
BY
ATTORNEYS Patented Sept. 13, 1949

2,481,677

UNITED STATES PATENT OFFICE 2,481,677

CAMERA FINDER AND FOCUS INTER-LOCKING MECHANISM

Ralph E. McAdam and Kenneth E. Bauer, Rochester, N. Y., assignors to Eastman Kodak Company, Rochester, N. Y., a corporation of New Jersey Application June 6, 1946, Serial No. 674,853

8 Claims. (Cl. 95—44)

This invention relates to photography, and more particularly to adjusting means for photographic cameras. One object of our invention is to provide a photographic camera with a means for visually indicating and simultaneously adjusting mechanisms used in focusing, including focusing scales, a range finder and parallax-correcting mechanism. Another object of our invention is to provide a camera of the type using a number of different lenses of known focal lengths with a single adjusting mechanism by which the various mechanisms can be simultaneously moved to their proper operating positions for the different focal length objectives. Another object of our invention is to provide a camera-adjusting mechanism which can only be adjusted when the parts are in a predetermined position to thus protect the parts against damage due to improper use. A still further object of our invention is to provide a single adjustable member with a ratio multiplying system by which different parts of the apparatus may be moved to different extents to properly adjust the camera whereby the positioning of one focusing scale will also position the range finder mechanism and the parallax-correcting mechanism for the selected focal length lens. Other objects will appear from the following specification, the novel features being particularly pointed out in the claims at the end thereof.

In cameras, and particularly in cameras of the so-called hand-stand type, it is customary to provide a camera with a number of different lenses of different focal lengths. Most cameras may be equipped with a range finder and parallax-correcting mechanism for one of the several lenses, but, usually, parallax correction and range finding will be incorrect for other of the lenses adapted to go on the camera. In some instances, adjustments have been made individually for various focusing scales for adjusting a variable range finder mechanism and for adjusting a variable parallax-correcting mechanism but so far as we are aware, very few structures have been used in the past by which a single operating member may simultaneously make all the required adjustments and so far as we are aware, no mechanisms have been provided for preventing the improper operation of the single operating, or setting, lever so that if one of the mechanisms is properly set for a lens of known focal length, all of the mechanisms will be so set.

Coming now to the drawings in which like reference characters denote like parts throughout:

Fig. 1 is a part section and part side elevation of a camera constructed in accordance with and embodying a preferred form of our invention;

Fig. 2 is an enlarged fragmentary sectional view taken transversely through the camera shown in Fig. 1;

Fig. 3 is an enlarged sectional view through a housing containing a view finder and range finder;

Fig. 4 is an enlarged fragmentary detailed section showing a cam block and parts which the cam block may operate;

Fig. 5 is an enlarged fragmentary section showing a portion of the focus-indicating scale and pointer;

Fig. 6 is an enlarged sectional view taken on line 6—6 of Fig. 7 and showing the relationship of the two camera parts which may be adjusted one relative to the other for focusing;

Fig. 7 is an enlarged detail section taken on line 7—7 of Fig. 3 and showing a portion of the camera top in elevation;

Fig. 8 is a perspective detail showing a cam block; and

Fig. 9 is an enlarged fragmentary section through a portion of the focusing scale-adjusting mechanism.

In the preferred embodiment of our invention shown in the drawings, the camera may consist of a camera body 1 of generally rectangular shape in which a frame 2 is mounted to slide, the frame 2 carrying a slide member 3 attached as by rivets 4 so that the slide may move freely between rails 5 carried on the side walls of the camera body 1. The camera body 1 may carry a bed 6 hinged at 7 to the camera body and carrying a track 8 on which a lens carriage 9 is mounted to slide, handles 10 being provided for moving the lens carriage out to a fixed position on the camera bed. The lens carriage 9 supports a lens board 11 to which a shutter 12 of a known type may be affixed; this shutter carrying a rear lens in the lens cell 13 and a front lens in the lens cell 14. The usual type of setting lever 15 and trigger 16 may be provided.

The camera bed 6 may be held at right angles to the camera body 1 by means of a pair of similar bed braces; each bed brace 17 being pivotally attached in a known manner to the camera bed 6 and being provided with spaced notches 18 and 19, either one of which may engage a stud 20. A spring, not shown, is used to thrust the bed braces 17 in the direction shown by the arrow and into engagement with the stud 19. As thus far described, the camera forms no part of our present invention.

In order to move one part of the camera relative to the other part for focusing, we prefer to provide a focusing knob 21 attached to a shaft 22 for turning a pinion 23; this pinion meshing with a gear segment 24 carried by an arm 25 attached to a tubular shaft 26 extending across the top of the camera. Each side of the camera carries an arm 25 attached to the tubular shaft 26 and there is a slot 27 in each arm engaging a pin 28 on one of the slides 3, so that when the focusing knob 21 is turned, the arms will move the slides 3 in their respective tracks 5 and cause part 2 of the camera to telescope more or less into the body formed by the camera part 1, thereby focusing the camera.

Camera part 2 is provided with a way 29 which receives a sensitized material holder, such as a plate holder, a film pack holder, a roll holder, or a cut film holder. It also carries the rear end 30 of a bellows 31, the front end 32 of which is attached to the lens board 11.

There is a window 33 in the top of camera part 1, as shown in Fig. 5, this window being preferably covered by glass, or transparent sheeting 35, and preferably carrying an arrow, or an inscribed line on the surface, or beneath the window; this being diagrammatically indicated at 35A. Beneath this window and pointer there is a sheet 36 of suitable material, such as a white card or plastic material, bearing a series of printed or engraved focusing scales 37, 38, and 39, as indicated in Fig. 2. As also indicated on the focusing scales themselves, scale 37 is for an 80-mm. lens; scale 38 is for a 110-mm. lens, and scale 39 is for 143-mm. lens, these lenses being selected as a useful range for a camera adapted to take 2¼ x 3¼, or 6 x 9 cm. pictures. Each sheet 36 is provided with a series of slots 40, all of which are parallel and the purpose of which, as indicated in Fig. 9, is to locate the focusing scale carrying sheet upon a supporting plate 41 which is carried by a slide 42. Slide 42, as best shown in Fig. 5, may be moved in the track 43 carried by camera part 2. A series of notches 44, shown in Fig. 9, are positioned to engage a pin 45 pressed upwardly by a spring 46 to hold the slide with its focusing scales in any one of three selected positions. Thus, any focusing scale may be moved beneath the window 33 and held in such a position by the pin 45 and notches 44.

The apertures 49 in the sheet 36 engage upstanding flanges 47 formed from the plate 41 and these are used both to locate the focusing scale sheet and to provide a means for preventing the focusing scale from being moved except when the focal setting is at infinity. To accomplish this, the structure shown in Figs. 5 and 9 is employed in which there is a downwardly-extending lug 48 carried by camera part 1 which is adapted to lie between two of the upstanding lugs 47 in such a manner that when the flanges engage the sides of the lug 48, the slide 42 cannot be moved transversely, but when the focal setting between the camera parts 1 and 2 is shown to be at infinity, the parts will lie in their Fig. 5 position in which the lug 48 lies beyond the end of the lugs 47 so that transverse movement can be then accomplished by moving the slide 42 by means of a handle 49 projecting through a slot 50 in the camera wall.

When the user selects a lens to be placed on the camera, if the lens, for instance, should be a 110-mm. lens, the handle 49 may be used to slide the focusing scale 38 into its operative position beneath the window 33. This has been suggested in application Serial No. 674,381, Camera adjusting mechanism, Gillon and Haraden, filed June 4, 1946. However, it is also desirable to make the camera as foolproof as possible and it is, therefore, desirable to have the movement of handle 49 not only adjust the focusing scale properly for the selected lens, but to have this handle likewise adjust the optical parts of the camera. These optical parts may be either a view finder which may be corrected for parallax for lenses of different focal lengths, or, it may be a range finder which can be adjusted for use with lenses of different focal lengths, or, as in the preferred embodiment of our invention shown in the drawings, it may include both the range finder and the view finder.

In Fig. 1, the camera body portion 1 is shown equipped with a view finder 51 which does not include a range finder but which does include a parallax-correcting mechanism which will now be described.

The view finder 51 may include optical elements which are also used in a second embodiment of my invention which includes a range finder so that the optical parts will only be described once. The view finder is provided with a lens 52 which is carried in an oscillatable cell 53 having an upstanding and roughened flange 54 and having a front rectangular opening 55. The cell may be rotated through 90 degrees by means of the knurled edge 54 and may be held in a set selected position by means of a spring ball 56 entering either of two notches 57 in the oscillatable cell 53. The rear wall of the view finder is provided with a covered window 58, inside of which there is a view opening 59 carried by the mask plate 60. This plate is carried on the end of arm 61 attached by a screw 62 to a post 63 passing through an aperture 64 in the top wall of camera part 1 and projecting down to a rounded end 65 which constitutes a cam follower. This cam follower 65, as shown in Figs. 4 and 8, may engage any one of a series of cams 66, 67, and 68, formed on the cam block 69. Each of these cams is inclined at the proper angle for one of the three lenses used on this camera; that is, the 80, 110, or 143 millimeter lens. As shown in Figs. 4 and 8, all of these cams rise from a flat surface 70 on which the cam follower 65 rests when the camera focal setting is at infinity. When at infinity it is obvious that a slide 71 mounted to move transversely in a track 72 carried by the camera part 2 can move since the cam follower 65 will merely follow the flat surface 70. However, as soon as the knob 21 is turned to focus the camera on objects nearer than infinity, the cam follower 65 may ride up any one of the three cams, 66, 67, or 68, according to the position of the cam block 69. Since the flanges 48 and 47 prevent movement of the focusing scale sheet 36, and since the cam block 69 can only be moved when the focusing scale slide 42 is moved (as will be hereinafter described), it is impossible to move the slide 71 transversely when the cam follower 65 is engaged with any one of the cams 66, 67, or 68. Therefore, it is impossible to damage the mechanism, as might well occur if the slide 71 could be moved with the cam follower resting on a cam.

In Fig. 8, the arrow A designates the movement of the slide 71 and the arrow B indicates the movement of the cam block 69 with respect to the cam follower 65 since, of course, the cam block moves when the camera part 2 is moved for focusing.

With the construction above described, when the camera part 2 is moved, the cam follower 65 will slide on one of the three cams and thereby incline the optical axis of the view finder since the pin 63, through the arm 61, will raise, or lower, as the case may be, the peepsight 59. If only a view finder is used, the mechanism above described will be all that is required. In addition, there may be a light-guard plate 74, as shown in Fig. 3; this plate being supported by a post 75. The corrugations are merely to prevent reflection of light rays in the finder, this also being true of the masking plate 60. Thus, the entire mechanism for the view finder may be enclosed in the housing 51 of Fig. 1, or if a combined view finder and range finder is used, it may be included in the central portion 75 of a housing 76, shown in Figs. 6, 7, and 3. The housing 76 may include all of the optics necessary for a range and view finder. Thus, this housing will include the optical elements of the viewing device above described and, in addition, it may include the following range finder elements. Behind the windows 77 and 78 in the front wall 79 of the housing there may be located lenses in adjustable mounts 80 and 81. Behind each of these lenses are supports 82 and 83 carried by the bottom wall 84 of the housing. Each lens lies in front of a prism; one prism 85 being carried by a lever 86 which may turn about a pivot 87, and the other prism 88 being fixedly attached to the bottom wall 84 by means of a bracket 89. A spring 90 tends to move the lever 86 to engage a flange 91 with an adjusting screw 92 carried on the upper end 93 of a bell crank lever pivoted at 94 to the housing, and including a cam follower 95 on the lower arm 96 of the bell crank lever. This cam follower is positioned to engage any one of the cams 97, 98, or 99, as shown in Fig. 8; these cams all terminating in a flat surface 100 on which the cam follower 95 rests when the focal adjustment of the camera parts 1 and 2 is at an infinity position. When in this position, the slide 71 may move laterally and the cam follower may slide on the surface 100. When, however, the camera parts are adjusted to focus on objects closer than infinity, the cam will follow down whichever cam is in alignment.

We have found it convenient to provide a single cam block 69 with all of the cams for both of the optical devices, that is the view finder and the range finder. Thus, the cam block is carried by the transverse slide 71 and this slide can only be moved when the sheet carrying the focusing scales is moved because of the following linkage. The focusing scale slide 42, as best shown in Fig. 2, is provided with an ear 105 carrying a stud 106 to which a link 107 is pivoted; this link carrying a stud 108 pivotally connecting it to a link 109 pivotally mounted at 110 to the camera part 2. A pivot 111 carried by the link 109 supports one end of a link 112 pivotally attached at 113 to the cam slide 71. The ratio of the linkage is so arranged that while the focusing scale slide is moving a distance roughly equal to the width of one focusing scale, the cam block slide is moving a much shorter distance which is equivalent to the width of any one of the cams 66, 67, 68, 97, 98, or 99. Thus, each time the next adjacent focusing scale is positioned beneath the focusing window 33 in camera part 1, the next adjacent cam is positioned in alignment with the cam follower or the range finder mechanism or for the view finder parallax-correcting mechanism. Therefore, since these two slides must move together, it is impossible to adjust one without adjusting the other. If the operator moves the handle 49 to position the proper focusing scale in an operative position for the selected lens, the cams for the optical devices will also be adjusted without thought on the part of the operator. In other words, a single adjustment automatically positions the cam for operating the movable reflector 85 of the range finder and likewise automatically positions the cam in the path of the cam follower which automatically corrects the view finder for parallax for a selected lens.

In operation, our improved form of camera can be very easily and quickly adjusted by the mechanism which has been hereinabove described. If the operator should select a lens—say the 110-mm. lens—he then moves the handle 49, and if the handle can be moved, the camera parts 1 and 2 will be at an infinity setting. Otherwise, movement is blocked through the lug 46 engaging a flange 47, as indicated in Figs. 5 and 9. If the handle 49 can be moved, the operator moves it until the 110-mm. scale lies beneath the focusing window 33. This is all that is necessary. By moving the focusing scale slide 42, the differential link movement, through the links 107, 109, and 112, automatically moves the slide 71 carrying the cam block. Thus, both sets of cams are immediately and automatically adjusted when the focusing scale is adjusted. If the camera is of the type shown in Fig. 1, the cam block 69 may only use three cams, 66, 67, and 68, since the remaining cams are only useful where a range finder is included. In any event, all the operator needs to do is to adjust the handle 49 and the camera is automatically adjusted for use with a selected focal length lens.

We claim:

1. In an adjusting mechanism for cameras, the combination with a camera including a body, a part telescopically mounted on the body and adapted for movement relative thereto for focusing, means for receiving sensitized material carried by said part, an objective, means for supporting said objective at a selected distance from the camera body, a split-field type of range finder mechanism including an operating lever carried by the camera body, a finder carried by the camera body, means for correcting for parallax included in the finder and including a cam follower, a series of range finder cams and a series of parallax correcting cams all spaced apart and all carried by said camera part, a series of focusing scales all spaced apart and carried by the part telescopically mounted on the camera body, a transverse slide carried by the camera part and carrying the focusing scales, a movable mount carrying the series of cams for positioning a finder cam to coact with the parallax correcting cam follower and for positioning a range finder cam to coact with the range finder operating lever and a linkage connecting the series of cams and the focusing scales whereby they may be simultaneously and differentially moved.

2. In an adjusting mechanism for cameras, the combination with a camera including a body having means for viewing a focusing scale, a part telescopically mounted on the body and adapted for movement relative thereto for focusing, means for positioning a sensitized material carried by said part, an objective, means for supporting said objective at a selected distance from the camera body, a split-field type of range finder mechanism including an operating lever carried by the camera body, a finder carried by the camera body, means for correcting for parallax included in the finder and including a cam follower, a series of range finder cams and a series of parallax correcting cams all spaced apart and all carried by said camera part, said range finder and parallax correcting cams being connected together, a slide carrying the cams carried by the camera part for positioning a range finder cam to coact with the range finder operating lever and to position a parallax correcting cam to coact with the parallax correcting cam follower, a series of focusing scales carried by the camera part, a transverse slide carrying the focusing scales to operatively position a scale relative to the means for viewing the focusing scale, a linkage connecting the two slides for driving one from the other and at a different ratio.

3. An adjusting mechanism as defined in claim 1, characterized by the focusing scales each including an infinity graduation, said infinity graduations of the scales being in alignment, cooperating means on a transverse slide and the camera body for preventing movement of the transverse slides unless the focusing scales are at an infinity setting.

4. An adjusting mechanism as defined in claim 1, characterized by the focusing scales each including an infinity graduation, said infinity graduations of the scales being in alignment, cooperating means on a transverse slide and the camera body for preventing movement of the transverse slides unless the focusing scales are at an infinity setting and comprising ribs carried by a transverse slide extending parallel to the objective axis, a projection from the camera body adapted to engage a rib if an effort is made to move the slide at a position other than at an infinity setting of the focusing scales.

5. In an adjusting mechanism for cameras, the combination with a two-part camera body including a first part on which an objective is supported and said first part being adapted to support objectives of different focal lengths, a second part including means for supporting a film in a focal plane to receive an image from the objective, said second part being movable relative to the first part for focusing, of a range finder optical system carried by the first part including means for forming an image at a viewing station, adjusting means included in the range finder for adjusting the range finder for objectives of different focal lengths, the second camera part including a cam block having spaced cams for said objectives of different focal length, a transverse slide, a cam block carried by the slide and movable to position a cam thereof in operative relationship with the range finder, a cam contacting member engageable with a positioned cam and included in the range finder, a transverse slide carrying a focus-indicating device, said focus-indicating device including a pointer and focusing scales, one for each objective of different focal lengths; each focusing scale including an infinity graduation; all the infinity graduations being in alignment, and links pivotally attached to the transverse slide carrying the cam block for moving the block, a third link connecting the transverse slides for movement together to simultaneously and operatively position one cam and one focusing scale relative to the pointer for a lens of a predetermined focal length.

6. In an adjusting mechanism for cameras, the combination with a two-part camera body including a first part on which an objective is supported and said first part being adapted to support objectives of different focal lengths, a second part including means for supporting a film in a focal plane to receive an image from the objective, said second part being movable relative to the first part for focusing, of a range finder optical system carried by the first part including means for forming an image at a viewing station, adjusting means included in the range finder for adjusting the range finder for objectives of different focal lengths, the second camera part including a cam block having spaced cams for said objectives of different focal length, a transverse slide, a cam block carried by the slide and movable to position a cam thereof in operative relationship with the range finder, a cam contacting member engageable with a positioned cam and included in the range finder, a transverse slide carrying a focus-indicating device, said focus-indicating device including a pointer and focusing scales, one for each objective of different focal lengths; each focusing scale including an infinity graduation; all the infinity graduations being in alignment, a short link attached to one transverse slide and a long link attached to the other transverse slide, each link being also pivotally attached to a third link at different distances from a pivotal support for the third link whereby said transverse slides may be moved at different ratios through said linkage.

7. In an adjusting mechanism for cameras, the combination with a two-part camera body including a first part on which an objective is supported and said first part being adapted to support objectives of different focal lengths, a second part including means for supporting a film in a focal plane to receive an image from the objective, said second part being movable relative to the first part for focusing, of a range finder optical system carried by the first part including means for forming an image at a viewing station, adjusting means included in the range finder for adjusting the range finder for objectives of different focal lengths, the second camera part including a cam block having spaced cams for said objectives of different focal length, a transverse slide, a cam block carried by the slide and movable to position a cam thereof in operative relationship with the range finder, a cam contacting member engageable with a positioned cam and included in the range finder, a transverse slide carrying a focus-indicating device, said focus-indicating device including a pointer and focusing scales, one for each objective of different focal lengths; each focusing scale including an infinity graduation; all the infinity graduations being in alignment, and links pivotally attached to the transverse slide carrying the cam block for moving the block, a third link connecting the transverse slides for movement together to simultaneously and operatively position one cam and one focusing scale relative to the pointer for a lens of a predetermined focal length, and means carried by the first camera part and the relatively movable second camera part for preventing movement of the transverse slides through said linkage except when the focusing scales and the pointer indicate an infinity setting.

8. In an adjusting mechanism for cameras, the combination with a two-part camera body including a first part on which an objective is supported and said first part being adapted to support objectives of different focal lengths, a second part including means for supporting a film in a focal plane to receive an image from the objective, said second part being movable relative to the first part for focusing, of a range finder optical system carried by the first part including means for forming an image at a viewing station, adjusting means included in the range finder for adjusting the range finder for objectives of different focal lengths, the second camera part including a cam block having spaced cams for said objectives of different focal length, a transverse slide, a cam block carried by the slide and movable to position a cam thereof in operative relationship with the range finder, a cam contacting member engageable with a positioned cam and included in the range finder, a transverse slide carrying a focus-indicating device, said focus-indicating device including a pointer and focusing scales, one for each objective of different focal lengths; each focusing scale including an infinity graduation; all the infinity graduations being in alignment, and links pivotally attached to the transverse slide carrying the cam block for moving the block, a third link connecting the transverse slides for movement together to simultaneously and operatively position one cam and one focusing scale relative to the pointer for a lens of a predetermined focal length, and means carried by the first camera part and the relatively movable second camera part for preventing movement of the transverse slides through said linkage except when the focusing scales and the pointer indicate an infinity setting, said means carried by one camera part comprising a rib extending parallel to the objective axis and mounted on the focusing scale carrying slide, said means carried by the other camera part comprising a protuberance lying adjacent said rib at all times except when the focusing scales and pointer are set at an infinity position.

RALPH E. McADAM.
KENNETH E. BAUER.

REFERENCES CITED

The following references are of record in the file of this patent:

UNITED STATES PATENTS

| Number | Name | Date |
| --- | --- | --- |
| 2,123,494 | Barnack | July 12, 1938 |
| 2,140,260 | Cunningham | Dec. 13, 1938 |
| 2,220,021 | Ort | Oct. 29, 1940 |
| 2,353,227 | Drotning | July 11, 1944 |
| 2,408,184 | Aiken | Sept. 24, 1946 |

FOREIGN PATENTS

| Number | Country | Date |
| --- | --- | --- |
| 531,524 | France | Oct. 26, 1921 |
| 543,554 | France | June 7, 1922 |
| 398,045 | Germany | July 10, 1924 |